(12) United States Patent
Daniel et al.

(10) Patent No.: US 7,686,862 B1
(45) Date of Patent: Mar. 30, 2010

(54) COMPOSITE VANE AND METHOD OF MANUFACTURE

(75) Inventors: Mark Daniel, Coppell, TX (US); Dani Fadda, Dallas, TX (US)

(73) Assignee: Peerless Mfg. Co., Dallas, TX (US)

( * ) Notice: Subject to any disclaimer, the term of this patent is extended or adjusted under 35 U.S.C. 154(b) by 0 days.

(21) Appl. No.: 12/232,670

(22) Filed: Sep. 22, 2008

(51) Int. Cl.
*B01D 45/00* (2006.01)

(52) U.S. Cl. .................. 55/440; 55/441; 55/442; 55/443; 55/444; 55/445; 55/342; 55/343; 55/464; 55/465; 55/434; 55/DIG. 17; 96/355; 96/365

(58) Field of Classification Search .......... 55/440–445, 55/342, 343, 464–465, 434, 435; 96/355–365
See application file for complete search history.

(56) References Cited

U.S. PATENT DOCUMENTS

| | | | | |
|---|---|---|---|---|
| 1,803,854 A | * | 5/1931 | Kniskern | 95/272 |
| 1,896,656 A | * | 2/1933 | Anderson | 29/460 |
| 1,956,591 A | * | 5/1934 | Gies | 96/72 |
| 2,643,736 A | * | 6/1953 | Smith | 55/440 |
| 3,093,466 A | * | 6/1963 | Zankey | 96/114 |
| 3,285,156 A | * | 11/1966 | Bohanon | 454/277 |
| 3,405,511 A | * | 10/1968 | Halter et al. | 55/440 |
| 3,490,210 A | * | 1/1970 | Horton et al. | 55/440 |
| 3,517,486 A | * | 6/1970 | Golden | 55/440 |
| 3,520,116 A | * | 7/1970 | Good | 55/440 |
| 3,805,496 A | * | 4/1974 | Sokolowski | 55/440 |
| 3,813,855 A | * | 6/1974 | Hill et al. | 55/440 |
| 3,849,095 A | * | 11/1974 | Regehr | 55/394 |
| 3,853,514 A | * | 12/1974 | Post | 96/230 |
| 3,870,488 A | * | 3/1975 | Arndt et al. | 55/440 |
| 3,899,427 A | * | 8/1975 | Connelly et al. | 210/521 |
| 3,912,471 A | * | 10/1975 | Cotton, Jr. | 55/440 |
| 3,925,040 A | * | 12/1975 | Fattinger | 96/356 |

(Continued)

FOREIGN PATENT DOCUMENTS

EP   135488 A2 *  3/1985

(Continued)

OTHER PUBLICATIONS www.acmanet.org., "products & process: process description", 2 pgs., 2007.

(Continued)

*Primary Examiner*—Jason M Greene
*Assistant Examiner*—Dung Bui
(74) *Attorney, Agent, or Firm*—Andrews Kurth LLP

(57) ABSTRACT

A vane having a profile capable of formation by pultrusion is disclosed. The vane can be used for removing liquids entrained in a gas stream. The vane includes a main curved section oriented generally parallel to the gas stream and curved to reorient the gas stream, the main curved section causing a first and a second change of direction of the gas stream; a first air pocket formed on a first side of the main curved section, the first air pocket sized and oriented into the gas stream where the gas stream first changes direction; and a second air pocket formed on a second side of the main curved section, the second air pocket smaller than the first air pocket and sized and oriented into the gas stream where the gas stream makes the second direction change.

19 Claims, 3 Drawing Sheets

U.S. PATENT DOCUMENTS

| | | | | |
|---|---|---|---|---|
| 3,938,972 A * | 2/1976 | Sugimura | 55/440 |
| 3,950,156 A * | 4/1976 | Kall | 55/440 |
| 3,977,977 A * | 8/1976 | Kall | 210/521 |
| 4,053,292 A * | 10/1977 | Schneider et al. | 96/245 |
| 4,141,706 A * | 2/1979 | Regehr | 55/437 |
| 4,175,938 A * | 11/1979 | Regehr et al. | 55/440 |
| 4,198,215 A * | 4/1980 | Regehr | 55/440 |
| 4,225,188 A * | 9/1980 | McGuire et al. | 299/64 |
| 4,322,234 A * | 3/1982 | Mock | 55/440 |
| 4,383,500 A * | 5/1983 | Lavalerie et al. | 122/491 |
| 4,430,101 A * | 2/1984 | Sixsmith | 55/440 |
| 4,521,350 A * | 6/1985 | Lefevre | 261/111 |
| 4,557,740 A * | 12/1985 | Smith | 55/440 |
| 4,581,051 A * | 4/1986 | Regehr et al. | 55/440 |
| 4,713,092 A * | 12/1987 | Kikuchi et al. | 96/70 |
| 4,714,055 A * | 12/1987 | Sundheimer | 122/488 |
| 4,738,698 A * | 4/1988 | Holcblat | 55/440 |
| 4,784,674 A * | 11/1988 | Sarmiento et al. | 95/272 |
| 4,802,901 A * | 2/1989 | Wurz et al. | 55/440 |
| 4,954,148 A * | 9/1990 | Alexander, Sr. | 96/277 |
| 4,975,101 A * | 12/1990 | Swanborn | 55/440 |
| 5,011,523 A * | 4/1991 | Roncato et al. | 65/441 |
| 5,104,431 A | 4/1992 | Fewel, Jr. | |
| 5,134,421 A | 7/1992 | Boyd et al. | |
| 5,203,894 A * | 4/1993 | Chowaniec | 55/440 |
| 5,268,011 A * | 12/1993 | Wurz | 55/440 |
| 5,269,823 A * | 12/1993 | Wurz | 55/440 |
| 5,389,127 A * | 2/1995 | Wurz et al. | 95/281 |
| 5,464,459 A * | 11/1995 | VanBuskirk et al. | 96/356 |
| 5,514,193 A * | 5/1996 | Schaal et al. | 96/356 |
| 5,653,786 A | 8/1997 | Taylor et al. | |
| 5,972,062 A * | 10/1999 | Zimmermann | 55/440 |
| 6,017,377 A * | 1/2000 | Brown et al. | 55/435 |
| 6,083,302 A * | 7/2000 | Bauver et al. | 95/216 |
| 6,224,043 B1 * | 5/2001 | Fan et al. | 261/114.1 |
| 6,315,804 B1 * | 11/2001 | Bradley | 55/440 |
| 6,663,742 B2 | 12/2003 | Robinson et al. | |
| 6,770,121 B1 * | 8/2004 | Sindel | 95/267 |
| 6,852,146 B2 * | 2/2005 | Holmes et al. | 95/216 |
| 7,041,780 B2 * | 5/2006 | Buckley et al. | 528/501 |
| 7,141,296 B2 | 11/2006 | Frank | |
| 7,255,333 B2 * | 8/2007 | Casper et al. | 261/122.1 |
| 7,270,690 B1 * | 9/2007 | Sindel | 55/320 |
| 7,424,999 B2 * | 9/2008 | Xu et al. | 261/97 |
| 2004/0007132 A1 * | 1/2004 | Holmes et al. | 95/272 |
| 2005/0120688 A1 * | 6/2005 | Shepherd | 55/440 |
| 2005/0268787 A1 * | 12/2005 | Johnson | 96/297 |
| 2006/0058187 A1 | 3/2006 | Lucas | |
| 2007/0137154 A1 * | 6/2007 | Agnello et al. | 55/440 |
| 2007/0137482 A1 * | 6/2007 | Xu et al. | 95/198 |

FOREIGN PATENT DOCUMENTS

| | | |
|---|---|---|
| EP | 330704 A1 * | 9/1989 |
| GB | 2199260 A * | 7/1988 |
| JP | 55031412 A * | 3/1980 |
| JP | 56002818 A * | 1/1981 |

OTHER PUBLICATIONS www.pultrusions.org, "the organisation of the pultrusion industry", 2 pgs., 2005.

www.pultrusions.org, "Glossary of composites and pultrusion related terms", 16 pgs.

* cited by examiner

COMPOSITE VANE AND METHOD OF MANUFACTURE

BACKGROUND

Virtually all air intake systems require an air filtering mechanism to maintain inlet air free of contaminants. This requirement is particularly true of shipboard engines and ventilation systems that operate in a salt spray environment, where moisture and salt particles impinging, for example, on fast spinning turbine blades can cause severe damage to the ship's propulsion system. In this environment, the filtering mechanism must be able to separate moisture from the inlet air, providing dry and clean air to the ship's propulsion system or ventilation system. This requirement is equally important in trains, offshore platforms, and other wet environments, among other applications.

In a specific example of a shipboard application, most naval vessels rely on fossil fuel for propulsion, and many of these vessels are powered by gas turbines. Gas turbine engines require significant quantities of air for combustion. This air is drawn into the combustion chamber through an air intake. The air intake, ideally, would be as high as possible above the waterline to minimize the possibility of water entrainment (i.e., entrainment of ocean spray) in the intake air stream. Because the air intakes are located high on the ship, their weight should be minimized to avoid making the ship less stable and more susceptible to rolling, and in a worst case scenario, capsizing.

SUMMARY

What is disclosed is a composite vane, having a profile capable of formation by pultrusion, for removing liquids entrained in a gas stream. The composite vane has a main curved section oriented generally parallel to the gas stream and curved to reorient the gas stream. The main curved section causes a first and a second change of direction of the gas stream. The composite vane also includes a first air pocket formed on a first side of the main curved section, the first air pocket sized and oriented into the gas stream where the gas stream first changes direction, and a second air pocket formed on a second side of the main curved section. The second air pocket is smaller than the first air pocket and sized and oriented into the gas stream where the gas stream makes the second direction change.

DESCRIPTION OF THE DRAWINGS

The Detailed Description will refer to the following drawings in which like reference numbers refer to like items, and in which.

DETAILED DESCRIPTION

Figure 1:
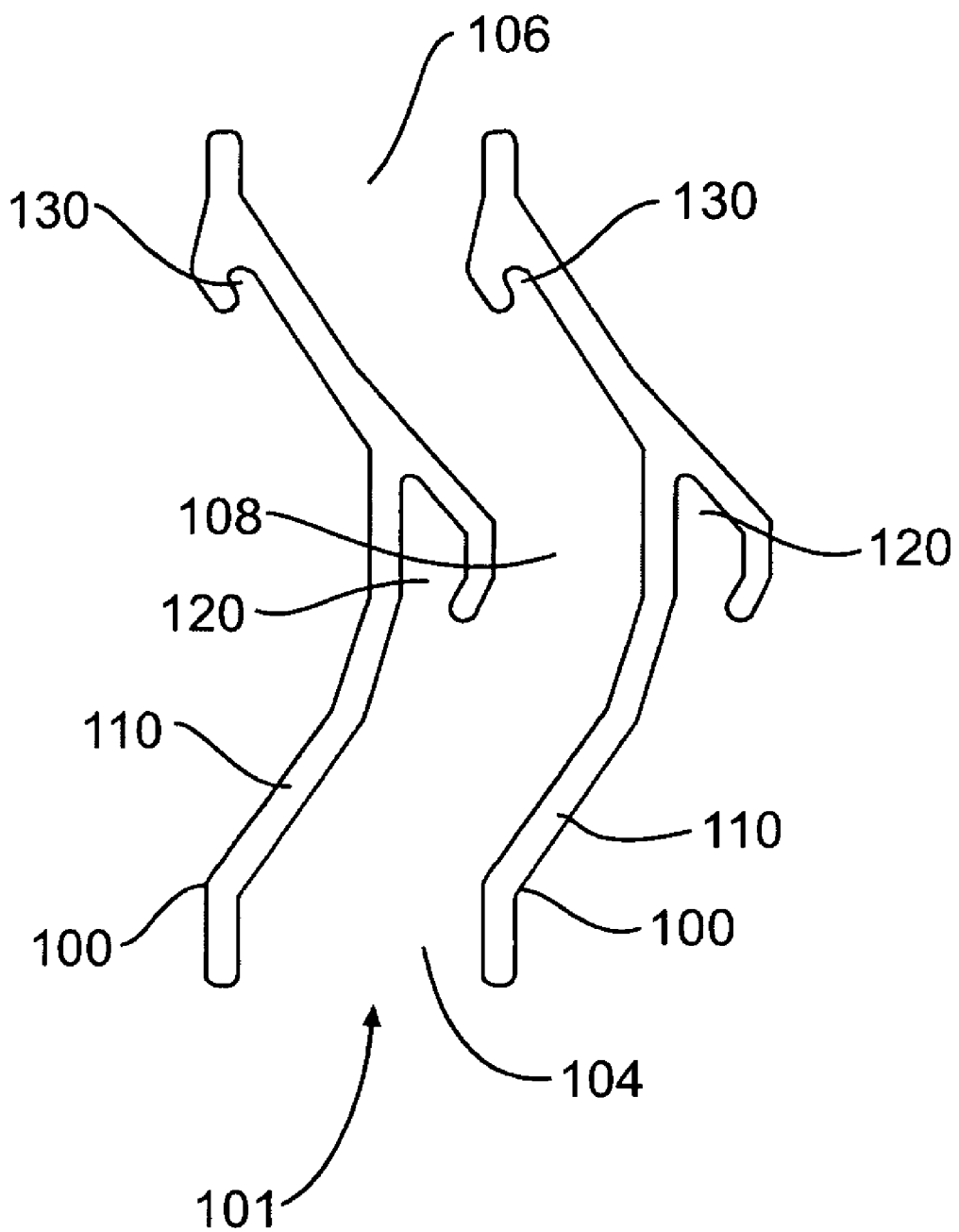
FIG. 1 illustrates, in horizontal cross section, exemplary composite vanes for use in a moisture removal application.

A composite vane as shown in the above figures, and as described below can be used in air intake systems such as naval applications related to propulsion system air intakes to maximize liquid droplet removal efficiency while addressing design tradeoffs related to ship stability and system maintenance.

While the discussion that follows will focus on the shipboard and naval application of this technology, those skilled in the art will understand that the claimed invention can be applied in many other fields of endeavor, including non-shipboard moisture separation applications. In particular, the composite nature of the air intake vane makes it ideal where corrosion resistance is important, where reduced weight is important, and where rigidity and strength are important. In addition, the herein described composite vane is inexpensive to form, compared to prior art moisture separators, is not subject to stress cracking as in prior art systems, and requires no maintenance.

Ship stability (resistance to roll) can be defined in terms of the ship's center of buoyancy B, center of gravity G, and metacenter M. When a ship is exactly upright, these three "centers" are aligned vertically. When a ship tilts (rolls to port or starboard) the center of buoyancy B of the ship moves laterally. The point at which a vertical line through the tilted center of buoyancy crosses the line through the original, non-tilted center of buoyancy B is the metacenter M.

The distance between the center of gravity and the metacenter is called the metacentric height, and is usually between one and two meters. This distance is also abbreviated as GM. As the ship heels over (rolls by angle $\phi$), the center of gravity G generally remains fixed with respect to the ship because the center of gravity G just depends upon position of the ship's mass and cargo, but the M, moves up and sideways in the opposite direction in which the ship has rolled and is no longer directly over the center of gravity G.

The righting force on the ship is then caused by gravity pulling down on the hull, effectively acting on its center of gravity G, and the buoyancy pushing the hull upwards; effectively acting along the vertical line passing through the center of buoyancy B and the metacenter M above it. This creates a torque that rotates the hull upright again and is proportional to the horizontal distance between the center of gravity G and the metacenter M (i.e., the metacentric height). The metacentric height is important because the righting force is proportional to the metacentric height times the sine of the angle of heel. Moreover, if the metacentric height approaches a small value, any rolling of the ship can cause the metacenter M to be displace below the center of gravity. In this condition, the ship will capsize. Accordingly, ship designers always are concerned about adding weight to a ship above its waterline because such added weight decreases the metacentric height and leads to a less stable ship.

Any air intake system intended for shipboard applications should be designed to facilitate preventive maintenance, and in particular to address possible corrosion concerns. By using a composite vane as opposed to more traditional stainless steel or aluminum vanes, many preventive maintenance problems can be avoided.

The disclosed composite vane falls into the class of inertial impaction separators. Inertial impact separation occurs when a gas passes through a tortuous path around vane pockets while the solid or liquid droplets tend to go in straighter paths, impacting these pockets. Once this occurs, the droplet coalesces within the vane pockets and drains away from the air. The composite vane weighs much less than comparable stainless steel vanes, and thus leads to a more stable ship design.

To form such a composite vane, a manufacturing technique know as pultrusion may be used. Pultrusion (pull+extrusion) is particularly well-suited for the formation of products from composite materials. The pultrusion process begins when racks or creels holding rolls of fiber matt or doffs of fiber roving are de-spooled and guided through a resin bath or resin impregnation system. The fiber may be reinforced with fiber glass, carbon, aromatic polyamide (aramid), or a mixture of these substances. In some pultrusion processes, the resin may be injected directly into a die containing the fiber.

The resin used in pultrusion processes is usually a thermosetting resin, and can be combined with fillers, catalysts, and pigments. The fiber reinforcement becomes fully impregnated with the resin such that all the fiber filaments are thoroughly saturated with the resin mixture. The thermosetting resin may be selected from the group consisting of vinyl ester resins, epoxy resins, and combinations thereof.

As the resin-saturated fiber exits the resin impregnation system, the un-cured composite material is guided through a series of tooling that helps arrange and organize the fiber into the desired shape while excess resin is squeezed out (debulked). Continuous strand mat and surface veils may be added in this step to increase structure and surface finish.

Once the resin impregnated fibers are organized and debulked, the un-cured composite passes through a heated die. The die is typically made of steel, may be chromed (to reduce friction), and is kept at a constant temperature to cure the thermosetting resin. The material that exits the die is a cured, pultruded fiber reinforced polymer (FRP) composite.

A surface veil may be applied to the FRP composite. Such a veil may, for example, be used to adjust (increase or decrease) surface wettability.

The composite material is then cut to the desired length by a cut off saw, and is ready for installation.

One goal that must be achieved in designing a composite vane, and incorporating these composite vanes into a coalescer, is to maximize liquid droplet removal efficiency while preventing liquid re-entrainment. Re-entrainment occurs when liquid droplets accumulated on the vanes are carried off by the exiting gas. This occurs when the force exerted on the liquid droplets clinging to the vanes due to the velocity of the exiting gas, or annular velocity, exceeds the gravitational forces of the draining droplets (see FIG. 2). Thus, in designing a composite vane (and its corresponding coalescer), the following parameters may be taken into account: gas velocity through the coalescer stages, annular velocity of gas exiting the stages, solid and liquid aerosol concentration in the inlet gas, and drainability of the coalescer. Each of these factors with the exception of the inlet aerosol concentration can be controlled. At a constant gas flow rate, gas velocity can be controlled by either changing the profile and spacing of the vanes or by increasing or decreasing the number of vanes used.

At a constant gas flow rate, the exit velocity of the gas can be controlled by changing the spacing between the vanes. Drainage can be improved by either selecting low surface energy vane materials or by treating the vanes with a chemical or applying a material that lowers the surface energy of the vane material to a value lower than the surface tension of the liquid to be coalesced. Having a low surface energy material prevents liquid from wetting the vane material and accelerates drainage of liquids down along the vanes. The liquid coalesced on the vanes falls rapidly through the network of vanes without accumulating on the vanes where it could be re-entrained.

FIG. 1 shows a profile of exemplary composite vanes 100 for use in an air intake application to remove moisture from combustion or ventilation air. Use of a FRP composite reduces weight, increases corrosion resistance, and reduces maintenance compared to the same vane profile formed using aluminum or stainless steel. The vanes have a width of about 5 inches, a height of about 1.75 inches, and as installed, a separation of about 1 5/16 inches at the inlet 104 and outlet 106, which are formed by arranging two of the composite vanes 100 in parallel as shown. However, vane separation may be varied, for example to as much as approximately 1.875 inches or more. The separation between the vanes 100 narrows in the regions containing pockets 120 and 130. In these regions, the separation may be about 0.75 inches. Vane thickness varies from about 3/16 inch to 1/8 inch, as shown. The thickness of the composite vanes 100 is determined based on considerations of rigidity in use, ease of formation by pultrusion, and minimal weight. The combination of these considerations results in the thicknesses shown in FIG. 1. The vanes 100 may be any length, and typically are about 5 inches to about 144 inches long. Air passage past the vanes 100 is indicated by the arrow 101.

Each vane 100 comprises a main curved section 110 and the two air pockets 120 and 130. The volumes of the air pockets 120 and 130 are chosen to maximize removal of liquids from the liquid-gas mixture. The air pockets 120 and 130 extend over the entire length of the vane 100. Although the main curved section 110 is shown as a series of flats, the main curved section 110 may, alternatively, comprise a smooth curve having approximately the same general shape as that of the series of flats illustrated. Because the air is made to change directions rapidly when moving past the curved sections 110 of the vanes 100, moisture entrained in the air can be removed easily. More specifically, at each change in direction caused by the shape of the composite vanes 100, a centrifugal force is exerted on the liquid-gas mixture, which throws the relatively heavy liquid droplets against the wetted vane walls. The liquid droplets coalesce into larger particles, absorb other particles, coalesce into sheet flow, and drain to a liquid sump at the bottom of the composite vanes 100 (see FIG. 2). In addition, liquid-gas mixtures traversing the composite vanes 100 in the direction of the arrow 101 travel toward the pockets 120 and 130, where coarse droplets are captured by the first pocket 120 and smaller droplets are captured by the second pocket 130 after acceleration through the venturi throat created by the first pocket 120. The air pockets 120 and 130 also further convolute and agitate the air stream, causing additional moisture separation. Once the liquid enters the pockets 120, 130, the liquid is isolated from the gas stream and drains by gravity into the liquid sump. Similar to moisture separation, solid particles may be removed from the liquid-gas stream due to the abrupt changes in direction of the gas as it passes through the composite vanes 100.

The relationship of the composite vanes 100 shown in FIG. 1 allows an increase in the speed of the gas flowing through the vanes 100 without re-entrainment of separated fluids. Furthermore, the narrowing of the separation between composite vanes 100 that occurs in the regions containing the pockets 120 and 130 creates throats 108. These throats 108 cause the liquid-gas mixture to accelerate, which makes removal of liquid droplets more efficient. Subsequent to flow through the throats 108, the liquid-gas mixture is expanded, and slows, so that the velocity of the mixture at the outlet 106 is the same as that at the inlet 104. With such construction, the vanes 100 can provide up to 90 percent removal efficiency for liquid droplets as small as 20 microns in diameter and 100 percent removal efficiency for 30 micron-diameter droplets.

Figure 2:
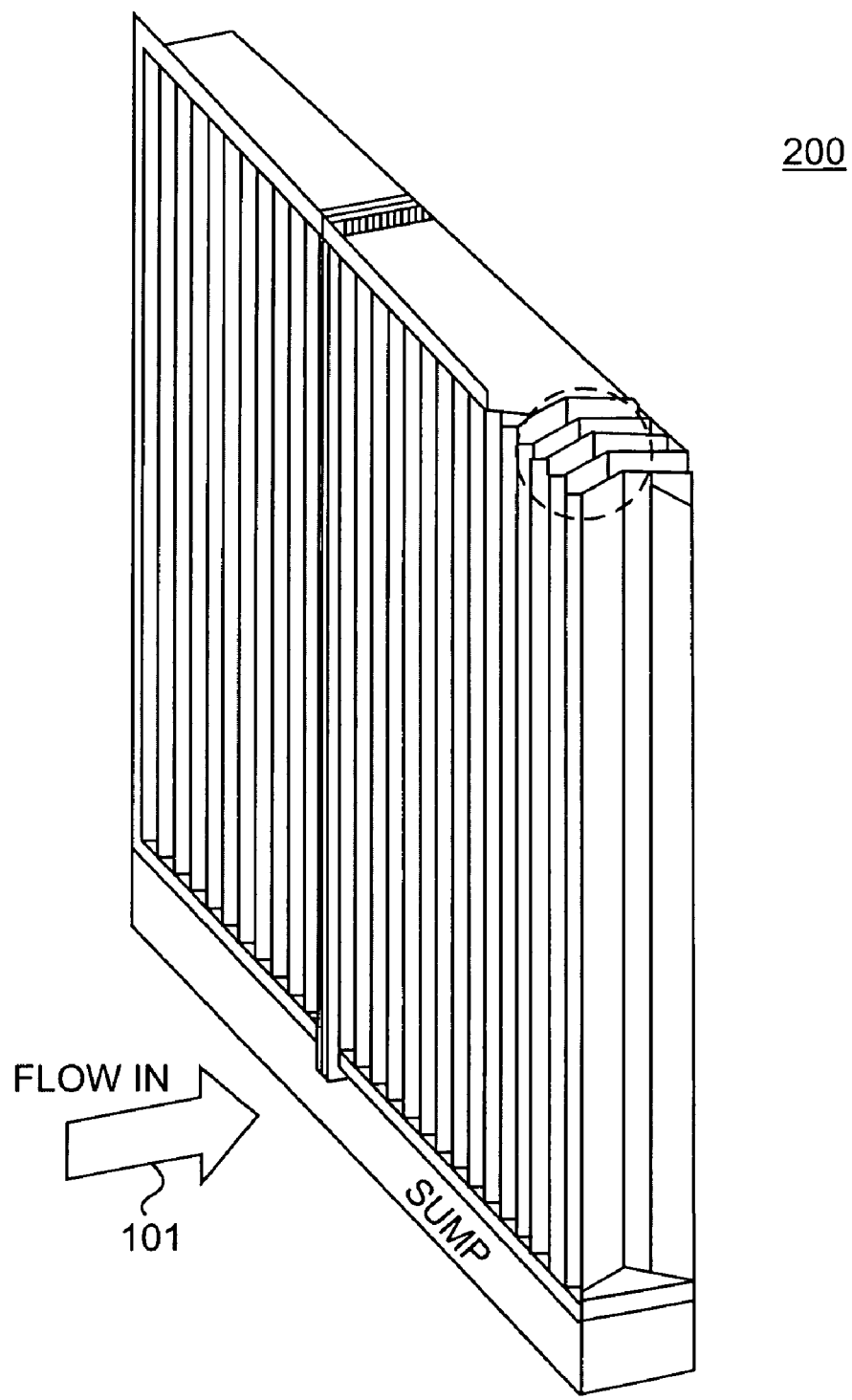
FIG. 2 illustrates a typical application of the composite vanes of FIG. 1.

FIG. 2 illustrates a typical application of the composite vanes of FIG. 1. As shown in FIG. 2, a shipboard air inlet plenum 200 is populated with a series of the composite vanes 100. Each vane 100 may be formed separately by the pultrusion process. Moisture entrained in the inlet air is removed at an efficiency of as much as 100 percent by passage past the vanes 100. The collected moisture drops by gravity to the bottom of the plenum 200, and may be removed. In a shipboard application, by using lightweight vanes made of a FRP composite, the ship's metacentric height is maximized.

Figure 3A:
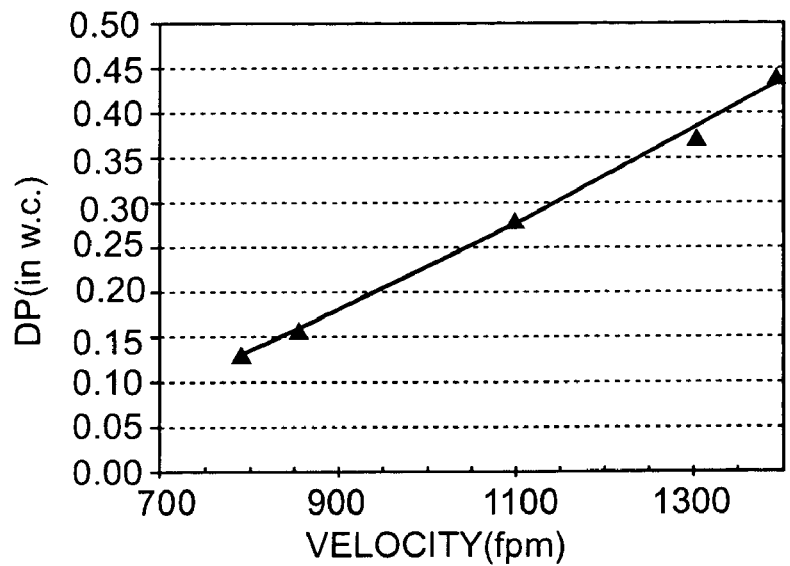
FIGS. 3A and 3B are graphs showing measured pressure drop and droplet removal efficiency for the composite vanes of FIG. 1.
Figure 3B:
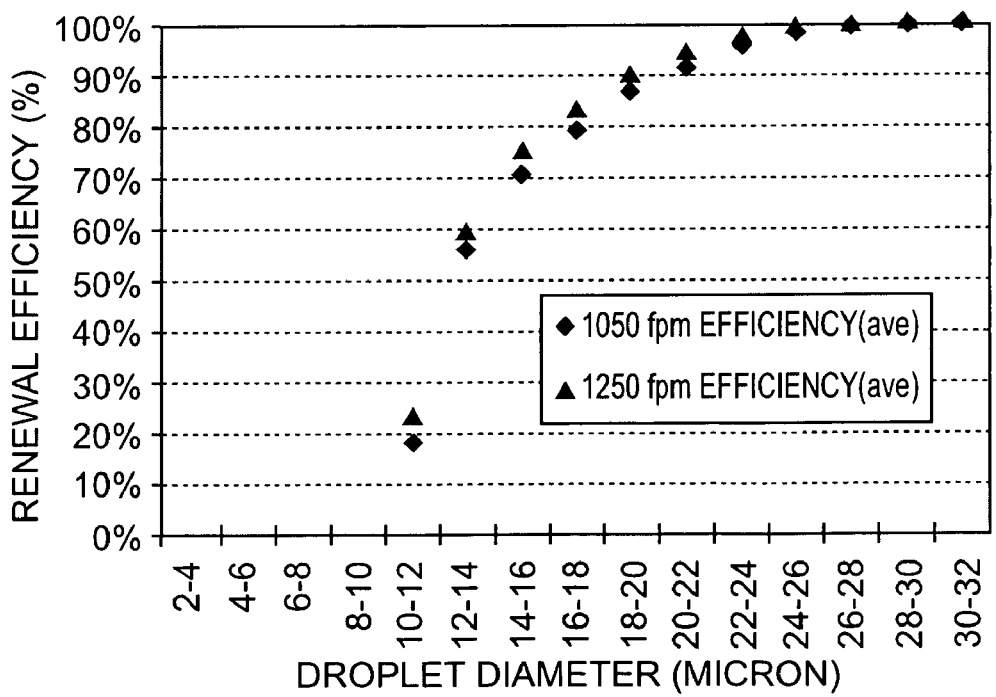

FIGS. 3A and 3B are graphs showing measured pressure drop (DP) and droplet removal efficiency (percentage removed), respectively, for a composite vane and different airflows. The curves illustrated are for a vane similar in profile to that shown in FIG. 1, with multiple vanes spaced about 1 5/16 inches apart. The measured results show that the composite vanes 100 perform at least as well as comparably-shaped vanes made, for example, of extruded aluminum. The results shown in FIGS. 3A and 3B correspond closely to experimental results obtained using computational fluid dynamics (CFD) to model the airflow. With this CFD model, a two-dimensional grid of triangular cells is used for the vane model. The CFD program is FLUENT™ Version 6.2, which uses the Navier-Stokes equations with K-ε model of turbulence.

Although disclosed applications of the vane 100 include shipboard installation into a gas turbine air inlet system and a ventilation system, the vane 100 has many other applications, including for other types of marine propulsion systems. In addition, the vane 100 may be used to remove condensate from vapors and absorptive liquid from treated gases. In an embodiment of the composite vane 100, a surface veil and an intermediate veil can be applied. Such a surface veil may reduce radar reflectivity. Other surface veils may, as noted above, be used to adjust surface wettability.

We claim:

1. A vane for removing liquids entrained in a gas stream, the vane having a profile capable of formation by pultrusion, comprising:
    a main curved section oriented generally parallel to the gas stream and curved to reorient the gas stream, the main curved section causing a first and a second change of direction of the gas stream;
    a first air pocket formed on a first side of the main curved section, the first air pocket sized and oriented into the gas stream where the gas stream first changes direction; and
    a second air pocket formed on a second side of the main curved section, the second air pocket smaller than the first air pocket and sized and oriented into the gas stream where the gas stream makes the second direction change, wherein the vane is a composite vane formed by pultrusion.

2. The vane of claim 1, wherein the vane is formed from materials including a fiber reinforced with one or more of fiberglass, carbon, and aromatic polyamide and a thermosetting resin.

3. The vane of claim 1, wherein a plurality of the vanes are placed at a predetermined separation to remove the liquids from the gas stream.

4. The vane of claim 3, wherein the separation is between about 1.0 inches and about 1.8750 inches and preferably is approximately 1.625 inches.

5. The vane of claim 1, further comprising a surface veil applied to the vanes to adjust surface wettability.

6. The vane of claim 1, further comprising additional layers applied to the vanes, wherein the layers operate to reduce visibility to radar.

7. The vane of claim 1, wherein the main curved section comprises a smooth curve.

8. The vane of claim 1, wherein the main curved section comprises a series of flats approximating a smooth curve.

9. The vane of claim 1, wherein the first air pocket, of a first composite vane in parallel construction with a second composite vane forms a first throat, wherein the gas stream is accelerated to enhance moisture entrainment by the second air pocket.

10. The vane of claim 1, wherein the main curved section has a thickness of about 3/16 inch and the first and the second pockets are defined by pocket walls having thicknesses of about 1/8 inch.

11. The vane of claim 1, wherein the vane has a width of about 5 inches and a length of between about 5 inches and about 144 inches.

12. The vane of claim 1, wherein the liquid droplet removal efficiency for 30 micron droplets is 100 percent.

13. A method for manufacturing a composite vane for use in removing liquid droplets from a gas stream, comprising:
    reinforcing a fiber material with one or more of fiberglass and aromatic polyamide;
    impregnating the reinforced fiber material with a thermosetting resin;
    pulling the impregnated reinforced fiber material through a die; and
    simultaneous with the pulling step, applying heat at a constant temperature to the material, whereby the composite vane having a desired profile is formed, and whereby the desired profile comprises:
        a main curved section oriented generally parallel to the gas stream and curved to reorient the gas stream, the main curved section capable of causing a first and a second change of direction of the gas stream;
        a first air pocket formed on a first side of the main curved section, the first air pocket located on the composite vane where the gas stream first changes direction; and
        a second air pocket formed on a second side of the main curved section, the second air pocket smaller than the first air pocket and located on the composite vane where the gas stream makes the second direction change.

14. A system for removing liquid droplets from a gas stream, comprising
    a plenum housing a plurality of composite vanes, the vanes separated by a predetermined distance, each composite vane comprising:
        a main curved section oriented generally parallel to the gas stream and curved to reorient the gas stream, the main curved section causing a first and a second change of direction of the gas stream,
        a first air pocket formed on a first side of the main curved section, the first air pocket sized and oriented into the gas stream where the gas stream first changes direction, and
        a second air pocket formed on a second side of the main curved section, the second air pocket smaller than the first air pocket and sized and oriented into the gas stream where the gas stream makes the second direction change, wherein the composite vane is formed from composite materials including a fiber reinforced with one or more of fiberglass, carbon, and aromatic polyamide, and a thermosetting resin; and
    a coalescer coupled to an exit from the plenum, the coalescer comprising a filter material to further remove the liquid droplets.

15. The system of claim 14, wherein the composite vanes comprise a series of flats having an overall generally curved shape.

16. The system of claim 14, wherein the coalescer is combined with other coalescers or other filters and vanes.

17. A system for removal of liquids and solid particles from a gas stream, comprising:

means for changing directions of the gas stream;
means for coalescing liquid droplets from the gas stream;
means for accelerating and decelerating the gas stream; and
means for collecting the coalesced liquid droplets.

18. The system of claim 17, wherein the means for changing directions of the gas stream comprises means for making a first and a second change of direction.

19. The system of claim 17, wherein the means for changing directions comprises two or more composite vanes arranged in a generally parallel configuration, the composite vanes formed by pultrusion from composite materials including a fiber reinforced with one or more of fiberglass, carbon, and aromatic polyamide, and a thermosetting resin.

* * * * *